Feb. 14, 1950            G. R. ROTHSCHILD            2,497,631

ARC WELDING

Filed May 14, 1948

INVENTOR
GILBERT R. ROTHSCHILD
BY
ATTORNEYS

UNITED STATES PATENT OFFICE 2,497,631

ARC WELDING

Gilbert R. Rothschild, Somerville, N. J., assignor to Air Reduction Company, Incorporated, New York, N. Y., a corporation of New York Application May 14, 1948, Serial No. 27,074

3 Claims. (Cl. 219—10)

This invention relates to electric arc welding and particularly to improvements in the use of gases in the operation of the gas shielded arc.

The method of arc welding in the presence of gases such as argon and helium affording a shield for the arc and the adjacent workpiece is well understood. For many purposes, such a method produces excellent results. Owing, however, to the characteristics of the gases used, it is not always possible to afford sufficient heat and penetration in the arc and consequently the method is not capable of universal application.

The so-called atomic hydrogen method in which an arc is struck between two electrodes adjacent the workpiece in the presence of a shield of hydrogen has also had some application but is not satisfactory for many purposes.

It has been suggested recently that a gaseous mixture of hydrogen 35% and argon 65% be used as a shield in connection with an arc between the workpiece and a single electrode. This procedure requires the maintenance of very critical conditions and also produces undesirable porosity in the weld.

It is the object of the present invention to provide an improved method of arc welding employing a gaseous mixture to shield the arc which avoids the disadvantages of methods heretofore known or used.

Figure 1:
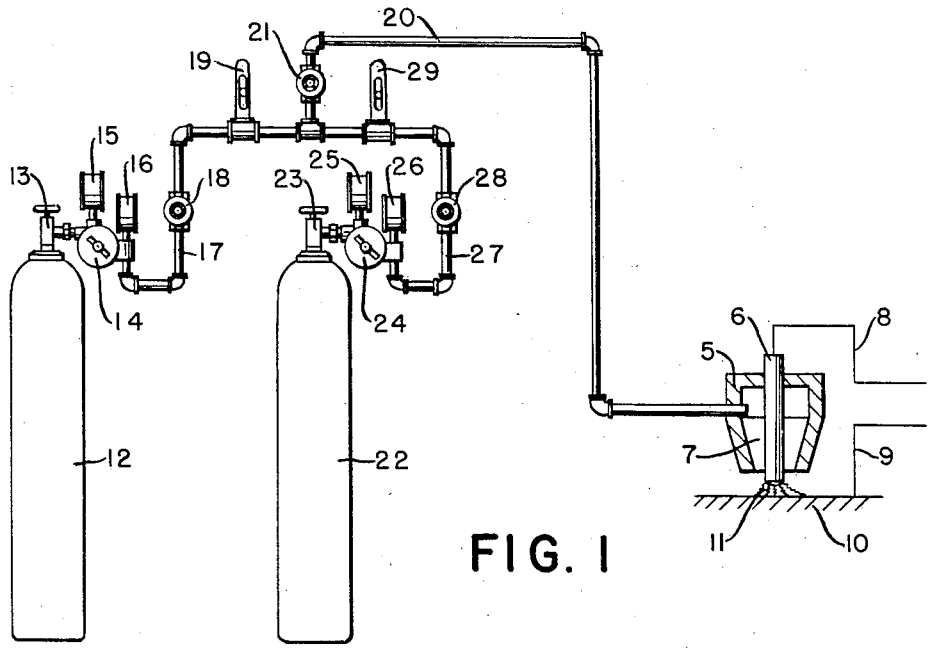
Figure 2:
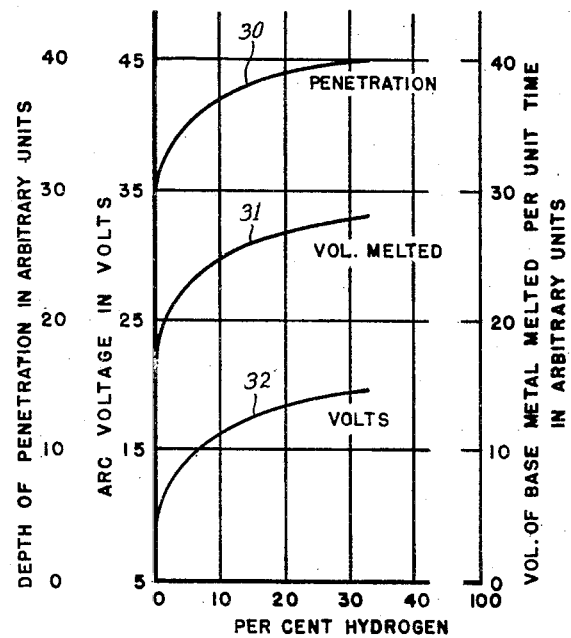

Other objects of the invention will be apparent as it is better understood by reference to the following specification and the accompanying drawing, in which Fig. 1 illustrates diagrammatically an apparatus suitable for the practice of the improved method; and Fig. 2 is a graph illustrating the results attained by the procedure hereinafter described.

I have discovered that by mixing hydrogen in proportions by volume of from 1% to not more than 10% with any of the rare gases of the atmosphere other than helium, such as argon, neon, xenon and krypton, and utilizing such a mixture as a protective shield for an arc between a single electrode and the workpiece, I am able to secure maximum heat and penetration, avoiding, however, the porosity which is usually the result of employing hydrogen either alone or in proportions of more than 10% in gaseous mixtures employed in shielded arc welding. While I prefer to use argon as the major constituent of the gaseous mixture, the desired results are attainable with the other rare gases mentioned, provided always that the proportion of hydrogen does not exceed 10% by volume. The addition of a small amount of hydrogen within the limits stated to argon or the other rare gases mentioned or to mixtures thereof results in an unpredictable advantage, namely, the sharp increase in penetration. The penetration continues to increase with additional quantities of hydrogen, but at a much lower rate, and porosity of the weld results from such additional quantities of hydrogen. Thus the desired effect is only obtainable with the lower proportions of hydrogen within the limits stated. A further advantage of the procedure as described is increase in the heat of the arc so that the welding operation is conducted more rapidly and satisfactorily. The invention affords advantages which are unobtainable by methods heretofore known and used.

Referring to the drawing, 5 indicates an electrode holder supporting an electrode 6, preferably of tungsten, though other available electrode materials may be used. The electrode holder is provided with a gas chamber 7. A conductor 8, from a suitable welding machine such as a generator or transformer and to the electrode 6, supplies current. A conductor 9 is also connected to the welding machine and to the workpiece 10. Thus, when the current is supplied, an arc 11 may be maintained between the electrode 6 and the workpiece 10 to effect the desired welding operation. A cylinder or other container 12, for a gas such as argon or one of the rare gases of the atmosphere other than helium, is provided with a valve 13 and a pressure reducing valve 14 so that the gas may be released at the desired pressure. Pressure gauges 15 and 16 indicate the pressure of the gas within the cylinder and the pressure to which it is released. The gas is delivered through a pipe 17 controlled by a valve 18 to a flow meter 19 and thence to a pipe 20 controlled by a valve 21 which delivers the gas to the chamber 7.

A cylinder or other container 22 maintains a supply of hydrogen. A valve 23 controls the outlet from the cylinder and the gas passes through a pressure-reducing valve 24. Pressure gauges 25 and 26 indicate the pressure within the cylinder, and the pressure to which the gas is released. The gas flows through a pipe 27, controlled by a valve 28, to a flow meter 29, and thence into the pipe 20.

Referring to Fig. 2 of the drawing, the line 30 shows the sharp rise in penetration which results from the inclusion of small amounts of hydrogen up to 10% to the shielding gas. The line 31 shows the rise in the volume of melted metal and the line 32 indicates the rise in arc voltage. The rapid increase of these factors indicates clearly the advantages of employing the procedure as described.

By the means indicated, mixtures of the two gases in the desired proportions can be delivered to the chamber 7 affording a shield about the arc 11 and the adjacent portions of the workpiece 10. By regulating the proportion of hydrogen by volume so that it does not exceed 10% of the gaseous mixture, it is possible, as above indicated, to maintain the arc 11 at its maximum efficiency of penetration and heat and thus to accomplish the welding operation more rapidly and satisfactorily.

Various changes may be made in the apparatus used and in the procedure as described without departing from the invention or sacrificing the advantages thereof.

I claim:

1. The method of welding with the electric arc which comprises striking an arc between the workpiece and an electrode and simultaneously and continuously delivering to the arc to form a protective gaseous shield therefor a mixture consisting of from 1% to not more than 10% of hydrogen by volume mixed with a rare gas of the atmosphere other than helium.

2. The method of welding with the electric arc which comprises striking an arc between the workpiece and an electrode and simultaneously and continuously delivering to the arc to form a protective gaseous shield therefor a mixture consisting of from 1% to not more than 10% of hydrogen by volume mixed with argon.

3. The method of welding with the electric arc which comprises striking an arc between the workpiece and an electrode and simultaneously and continuously delivering to the arc to form a protective gaseous shield therefor a mixture consisting of from 1% to not more than 10% of hydrogen by volume mixed with neon.

GILBERT R. ROTHSCHILD.

REFERENCES CITED

The following references are of record in the file of this patent:

UNITED STATES PATENTS

| Number | Name | Date |
| --- | --- | --- |
| 1,746,191 | Devers | Feb. 4, 1930 |
| 2,053,417 | Brace | Sept. 8, 1936 |